2,973,347

PROCESS FOR PRODUCING STABLE HALOETHYLENE POLYMERS

Carl B. Havens, Hope, Mich., assignor to The Dow Chemical Company, Midland, Mich., a corporation of Delaware No Drawing. Filed Dec. 24, 1956, Ser. No. 630,074

4 Claims. (Cl. 260—87.7)

This invention relates to a polymerization process for producing haloethylene polymers which are more stable than the polymers prepared by the prior known processes.

The polymers and copolymers of haloethylenic monomers such as vinylidene chloride and vinyl chloride are known to be sensitive to the degradative effects of heat and light and to be so badly discolored after prolonged exposure to light or elevated temperature as to be commercially useless. Continuous search has been made in an attempt to improve that stability by revamping polymerization recipes and methods. That has heretofore proven to be unsuccessful. The next approach was to find suitable additives which could be blended with the polymer to protect it from the effects of heat and light exposure. Because of the very complex nature of the requirements for such an additive, no universally effective stabilizer has ever been found. In addition to its primary requirement of a certain minimum stabilizing efficiency, it is necessary for commercial exploitation that such an additive be colorless, odorless, tasteless, non-toxic, non-volatile, insoluble in water and the common household solvents, and be compatible with the polymer being stabilized. Even if a satisfactory stabilizer could be found, its incorporation into the polymer formulation would require an added procedural step. The most satisfactory solution to the stability problems associated with haloethylene polymers would be to have a more stable polymer.

Accordingly it is the principal object of this invention to provide an improved polymerization process for polymerizing haloethylenic monomers.

It is a further object to provide such a process which will result in haloethylene polymers having improved heat stability.

It has now been found that improved haloethylene polymers may be produced by a non-emulsified suspension polymerization process wherein a small amount of a tertiary alcohol is incorporated into the aqueous phase prior to polymerization.

Any haloethylenic monomers, which result in a polymer or copolymer having halogen atoms pendant from the polymer chain, may be employed in this process to arrive at the improved polymers. Thus, any monomeric combinations comprising either vinyl chloride or vinylidene chloride may be used. The monomeric combinations consisting predominantly of vinylidene chloride result in copolymers which are particularly sensitive to the degradative effects of thermal exposure and accordingly such combinations are preferred subjects for use in this process.

The alcohols useful in this invention are those tertiary alcohols containing up to 12 carbon atoms. When the alcohol is one containing more than 12 carbon atoms there is little improvement in stability imparted to the polymer. It is necessary that the alcohols be tertiary. When the alcohols are other than tertiary there is no improvement in stability and with the primary alcohols there is a reduction in the stability of the polymers.

The alcohols should be employed in a concentration of from 0.5 to 10 percent based on the weight of the monomers and preferably from 1 to 4 percent. When less than 0.5 percent is used, any improvement is insignificant and when more than 10 percent is used, a proportional improvement in stability is not apparent, the polymerization costs are increased, and the kinetics of the polymerization system may be altered.

Non-emulsified aqueous suspension polymerizations are usually conducted at a phase ratio of from about 1 to 2.5 parts of water per part of monomer and such ratios are preferred in this process. When less than 1 part water per part of monomer is used, the heat transfer characteristics of the system are so poor as to make the reaction difficult to control. When the phase ratio has more than 2.5 parts of water per part of monomers the process becomes less attractive economically. In addition when water-soluble alcohols are used in a process having a phase ratio greater than 2.5-1 the effect of the alcohol may be so diluted as to lower the effectiveness of the process. When it is necessary to conduct such a polymerization it is desirable that a proportional increase in alcohol concentration be used to overcome the dilution effect.

Polymerization in non-emulsified aqueous suspension is well known. Typically the monomeric materials are dispersed into an aqueous phase comprising an oil-soluble polymerization catalyst and a granulating agent. The catalysts, which are usually oil soluble peroxides, such as benzoyl peroxides, are commonly used in a concentration of from about 0.1 to 3 percent based on the weight of the monomers. The granulating agents are selected from the hydrophilic colloids, such as the water soluble cellulose ethers and gums, and are usually used in a concentration of from 0.1 to about 5 percent based on the weight of the monomers. The dispersion is then warmed to a temperature of about 40 degrees to 70 degrees C. while agitated until polymerization is substantially complete. The polymer is isolated by filtration and then dried. Other variations of the process are possible and frequently used. Thus the catalyst may be dissolved in the monomers prior to dispersion, the polymerization may be conducted in an atmosphere of an inert gas, and the aqueous phase may be preheated to the polymerization temperatures prior to dispersion of the monomer. These and other known procedural techniques are intended to be included in this process. In carrying out the process of this invention the tertiary alcohol is added to the polymerization system at any time prior to polymerization. It is most convenient to add the defined alcohol to the aqueous phase prior to polymerization.

The principal advantage emanating from this process is that the polymer produced thereby requires less additional stabilizer than do the polymers prepared by the prior known processes. In many cases where some color is tolerable there is no need for any stabilizer at all. Since such additive stabilizers are costly to buy and to incorporate into the formulation, it is apparent that less expensive polymer formulations result from this process. Additionally those additive stabilizers are frequently defective in some way in being soluble materials or in having an undesirable odor or taste, or for some other reason. When such ts the case, it is preferred to employ the minimum concentration necessary to provide the requisite stability. With the polymers produced by this process that minimum is less than that required for the polymers produced by the prior processes. It is a further advantage, that when the defined alcohols are used in the expressed concentrations, that there is no apparent change in the polymerization kinetics. Thus the rates of polymerization with the alcohols present are the same as in their absence. Many of the known thermal stabilizing additives have a serious inhibitory effect on the polymerization system so that they cannot be added until polymerization is completed.

By way of example a suspension polymerization was conducted by dispersing a monomeric combination consisting of 85 parts by weight of vinylidene chloride and 15 parts by weight of vinyl chloride into an aqueous phase consisting of 250 parts by weight of water, 0.1 part by weight of benzoyl peroxide, and 2 parts by weight of tertiary butyl alcohol. The dispersion was maintained at 60 degrees C. while agitated for 40 hours after which the polymer was isolated by filtration and dried. Another polymerization was run using 4 parts by weight of tertiary butyl alcohol and another using 4 parts by weight of tertiary amyl alcohol was conducted. For comparison a run was made using no alcohol. Each of the polymers was formulated by blending it with 2 percent by weight of 2-hydroxy-5-chlorobenzophenone, a known light stabilizer, and 8 percent by weight of tributyl aconitate as a plasticizer. Compression moldings having a thickness of 0.01 inch were made and evaluated. One set of moldings was exposed to a temperature of 140 degrees C. for four hours and examined for discoloration. Another set was exposed to direct weathering at about 44 degrees north in the State of Michigan for three months and examined for discoloration. The results of this evaluation are listed in the following table.

Table

| Stabilizer | Percent | Percent Conversion [1] | Color After— | |
|---|---|---|---|---|
| | | | 4 hrs. at 140° C. | 3 mo. exp. |
| For Comparison: none | | 78.2 | Dark brown | Moderate darkening. |
| Alcohols of This Invention: t-butyl alcohol | 2 | 80.2 | Tan | Slight darkening. |
| Do | 4 | 80.0 | do | Do. |
| t-amyl alcohol | 4 | | do | Do. |

[1] The percentage of monomer converted to isolated polymer.

Similar results are obtained when the alcohols employed are tertiary octyl or lauryl alcohols and also when the monomer is vinyl chloride polymerized alone.

I claim:

1. In a non-emulsified aqueous suspension polymerization process wherein a monomeric material comprising a chloroethylenic monomer composed predominantly of vinylidene chloride with any remainder being of a copolymerizable monoethylenically unsaturated monomer is dispersed into from 1 to 2.5 parts of an aqueous phase for each part of said monomeric material, and wherein the so-formed dispersion is subjected to thermal and catalytic conditions known to induce polymerization until polymerization is substantially complete, the improvement consisting of conducting said polymerization in the presence of from 0.5 to 10 percent of the weight of said monomeric material of a tertiary alcohol containing up to 12 carbon atoms.

2. The improved process claimed in claim 1 wherein said polymerization is induced with an oil-soluble organic peroxide as a catalyst.

3. The improved process claimed in claim 2 wherein said dispersion is maintained at a temperature of from about 40 degrees to about 70 degrees C. until polymerization is substantially complete.

4. The improved process claimed in claim 1 wherein said tertiary alcohol is added to said aqueous phase prior to polymerization.

References Cited in the file of this patent

UNITED STATES PATENTS

| 2,494,517 | Naps | Jan. 10, 1950 |
| 2,501,647 | Ney | Mar. 21, 1950 |